United States Patent [19]

Tiefenthaler

[11] Patent Number: 4,603,710

[45] Date of Patent: Aug. 5, 1986

[54] NON-RETURN VALVE

[75] Inventor: Edelbert Tiefenthaler, Elgg, Switzerland

[73] Assignee: Sulzer Brothers Limited, Winterthur, Switzerland

[21] Appl. No.: 371,804

[22] Filed: Apr. 26, 1982

[30] Foreign Application Priority Data

May 25, 1981 [CH] Switzerland ............ 3404/81

[51] Int. Cl.$^4$ .............................................. F16K 21/10
[52] U.S. Cl. .................................. 137/514.7; 251/51; 251/55
[58] Field of Search ................. 137/514.7; 251/51, 53, 251/55

[56] References Cited

U.S. PATENT DOCUMENTS

| 515,578 | 2/1894 | Eynon | 137/514.7 |
|---|---|---|---|
| 816,216 | 3/1906 | Cash | 137/514.7 |
| 955,043 | 4/1910 | Barr et al. | 137/514.7 |
| 965,052 | 7/1910 | Wainwright | 137/514.7 |
| 1,003,412 | 9/1911 | Ballard | 137/514.7 |
| 1,029,600 | 6/1912 | Foster | 137/514.7 |
| 2,216,296 | 10/1940 | Raymond et al. | 137/514.7 |
| 2,646,074 | 7/1953 | Hopkins | 251/55 |
| 2,665,877 | 1/1954 | MacGregor | 137/514.7 |
| 2,672,888 | 3/1954 | Shields | 251/51 |
| 4,046,164 | 9/1977 | Pool | 137/514.7 |

Primary Examiner—Alan Cohan
Assistant Examiner—John A. Rivell
Attorney, Agent, or Firm—Kenyon & Kenyon

[57] ABSTRACT

The non-return valve comprises a housing provided with an inlet connection, a coaxial installation opening, and an outlet connection. An insert is secured in the installation opening to define a chamber with a cover on the valve. A movable valve body means includes a piston which divides the insert chamber into two cylindrical chambers while connecting ducts lead from the respective cylinder chambers to the housing chamber on the outlet side. A damping member is provided on the movable valve body system in the form of an annular ring to penetrate into the duct leading from the lower cylinder chamber when the valve closes to bring about a throttling action. Shock-like closure of the valve is thus eliminated in a simple and operationally reliably manner.

11 Claims, 1 Drawing Figure

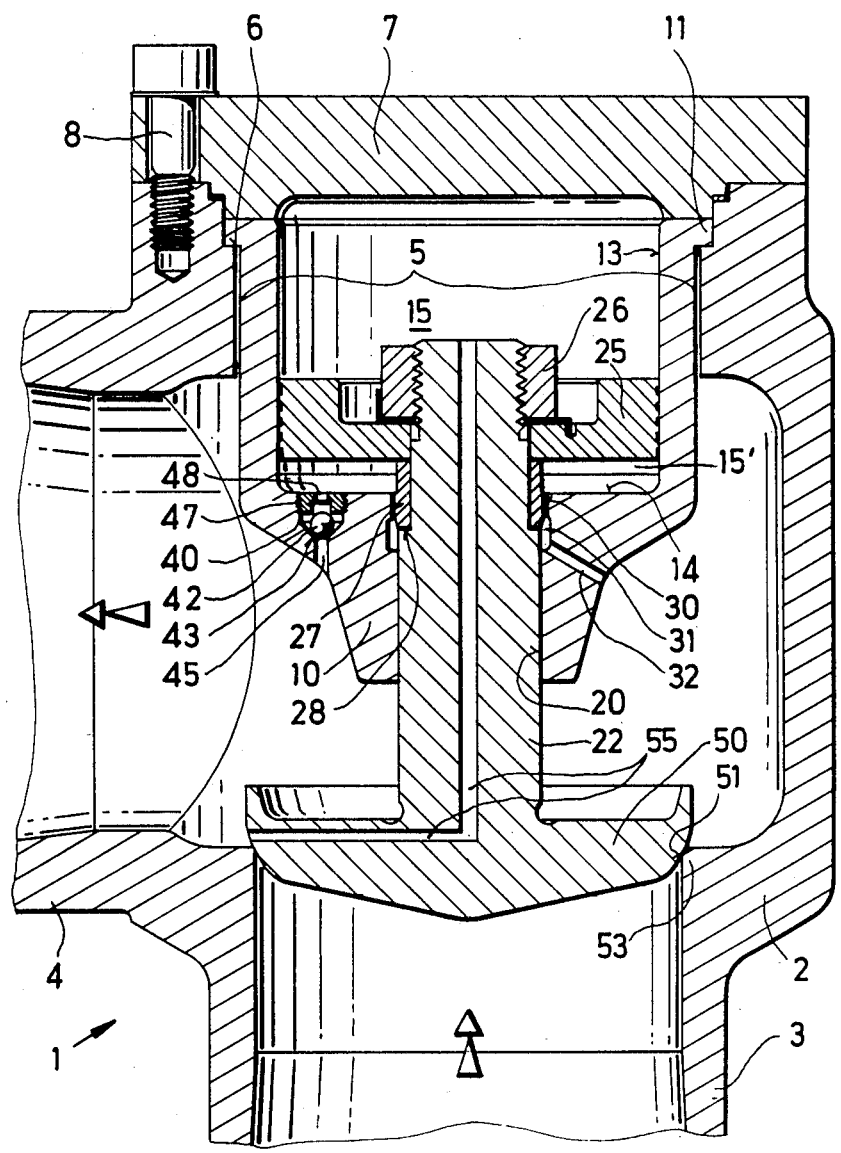

NON-RETURN VALVE

This invention relates to a non-return valve.

Heretofore, various types of non-return valves have been known. For example, Swiss Pat. No. 596,485 describes a non-return valve which can be used not only as a non-return valve but also as a controlled shut-off valve. However, if a valve of this type is used, for example, in a coolant feed line to a nuclear reactor, the valve might close so rapidly in the event of a break in the feed line upstream of the valve that an inadmissably high pressure shock would occur downstream of the valve. In such cases, a secondary break may occur downstream of the valve.

Accordingly, it is an object of the invention to damp the pressure shock caused by a break in a valve controlled line.

It is another object of the invention to reduce the closing speed of a non-return valve in response to a pipe break.

Briefly, the invention is directed to a non-return valve which is constructed of a housing which defines a chamber and which includes an inlet connection to the chamber, an installation opening opposite the inlet connection and an outlet connection from the housing chamber. In addition, the valve includes an insert mounted within the installation opening in order to define a second chamber coaxial to the inlet chamber as well as a movable valve body means for closing of the valve. The valve body means includes a displaceable piston which divides the second or insert chamber into two coaxial cylinder chambers, a valve spindle which is secured to the piston and passes through the insert and a valve disc which is secured to the spindle for selectively sealing the inlet connection in response to movement of the valve body means from a valve-open position to a valve-closed position.

In accordance with the invention, a first connecting duct communicates the cylinder chamber located between the piston and the installation opening with the housing chamber, a second connecting duct communicates the cylinder chamber between the piston and the inlet connection with the housing chamber and a damping member is secured to the movable valve body means for penetrating into the second duct in order to throttle flow therethrough upon movement of the valve body means into the valve-closed position.

One particular advantage of the non-return valve is that the construction is structurally simple and operationally reliable. In addition, the existing parts of a medium-controlled valve type can be used.

The insert of the valve may also be flanged and may be secured within the installation opening of the housing by a cover. Further, the housing may have a valve seat at the inlet connection while the valve disc has a circular sealing surface for seating on the valve seat.

The connecting ducts can be arranged so that the first duct extends longitudinally through the valve spindle and terminates adjacent the sealing surface of the valve disc. This arrangement allows the valve to be fully opened above a certain minimum medium throughput through the valve because a negative pressure is caused at the inlet to the connecting duct by the inflowing medium through the valve. The pressure drop at the valve is thus reduced.

The non-return valve may also be provided with a bypass duct which communicates the cylinder chamber between the piston and inlet connection with the housing chamber as well as with a non-return member in the bypass duct which allows a flow into the cylinder chamber from the housing chamber. This avoids the occurrence of a negative pressure which might result in cavitation erosion in the cylinder chamber in the event that the valve opens rapidly.

The damping member of the valve may be made as an interchangeable annular member which is secured between the piston and a shoulder on the valve spindle of the movable valve body means. This provides advantages in both manufacturing and operation since the damping characteristic of the valve can be rapidly and readily adapted.

These and other objects and advantages of the invention will become more apparent from the following detailed description taken in conjunction with the accompanying drawing wherein:

The FIGURE illustrates a cross-sectional view of a non-return valve constructed in accordance with the invention.

Referring to the drawing, the non-return valve 1 is disposed, for example, in a feed water line of a steam power plant. The valve 1 includes a housing 2 which defines a housing chamber and which has an inlet connection 3 for the inflow of feed water to the housing chamber, an outlet connection 4 at a right angle to the inlet connection 3 for the outflow of feed water from the housing chamber and an installation opening 5 which is disposed opposite and coaxially of the inlet connection 3.

The valve 1 also has an insert 10 which is fixedly mounted within the installation opening 5 to project into the housing 2 in order to define a chamber coaxial to the inlet connection 3. As indicated, the insert 10 has a flange 11 which rests on a shoulder 6 of the installation opening 5 and is in the form of a body of revolution which has a cylindrical bore 13 terminating in an end face 14.

A cover 7 is secured, as by bolts 8, to the housing 2 to secure the insert 10 in place.

The valve 1 also has a movable valve body means for closing the inlet connection 3. This means includes a displaceable piston 25 which is located within the bore 13 of the insert 10 in order to divide the insert chamber into two coaxial cylinder chambers 15, 15'. As indicated, suitable piston rings are provided for slidably sealing the piston relative to the insert bore 13. In addition, the valve body means includes a valve spindle or stem 22 which passes through a central bore 20 of the insert 10 in slidable relation. The piston 25 is fitted over the valve spindle 22 and is secured thereto by a nut 26 which is threaded onto a suitable thread on the spindle 22. As indicated in the drawing, a suitable locking washer can be employed to hold the piston 25 in place relative to the nut 26 and spindle 22. The valve body means also has a valve disc 50 secured to the spindle 22 in an integral manner for selectively sealing the inlet connection 3 in response to movement of the valve body means from the valve-open position to the valve-closed position as illustrated.

The valve disc 50 has a circular sealing surface 51 in the region of the outer edge which cooperates with a valve seat 53 at the inlet connection 3 for closing of the inlet connection 3 to a flow of feed water.

The valve also has a first connecting duct which is in the form of a right-angled bore 55 within the valve spindle 22 which communicates the cylinder chamber 15 on the installation opening side of the piston 25, i.e. between the piston 25 and the cover 7 with the housing chamber. As shown, the duct 55 terminates immediately above the sealing surface 51 of the valve disc 50, i.e. downstream of the sealing surface 51 during normal flow through the valve 1.

The valve 1 also has a second connecting duct which communicates the cylinder chamber 15' located beneath the piston 25, i.e. between the piston 25 and the inlet connection 3, with the housing chamber. This duct includes an inlet portion 30 of the insert bore 20, an annular chamber 31 which is formed between the inlet portion 30 and the remainder of the bore 20 and an inclined bore 32 which extends through the insert 10 into the housing chamber.

The movable valve body means carries a damping member in the form of an annular ring 27 for penetrating into the initial portion 30 and chamber 31 of the second connecting duct in order to throttle flow therethrough upon movement of the valve body means into the valve-closed position. As indicated, the annular ring 27 is secured between the piston 25 and a shoulder 28 on the valve spindle 22.

A bypass duct with a non-return member therein is also provided to communicate the cylinder chamber 15' with the housing chamber. As indicated, the bypass duct is formed by a tapped bore 40 which begins at the end face 14 of the insert 10, a conical part 43 and a through bore 45. The non-return member is in the form of a ball 42 which seats on the conical part 43. A short grub screw 47 is mounted into a screw thread in the bore 40. This screw 47 has a bore 48 and prevents the ball 42 from leaving the bypass duct while permitting axial movement. As indicated, the ball 42 forms a simple weight-loaded non-return member.

During operation, if the water pressure in the inlet connection 3 rises above the pressure in the outlet connection 4 and if the pressure differences on the movable valve body means exceed the weight of the means, the valve body means is lifted away from the valve seat 53. As long as the damping ring 27 is disposed within the duct portion 30 under these conditions, there is a possibility that a negative pressure will form in the cylinder chamber 15' and be such as to draw water in through the bypass duct past the ball 42. This prevents any evaporation from occurring in the cylinder chamber 15'. When the damping ring 27 exits from the duct portion 30, the water supply to the cylinder chamber 15' occurs completely via the inclined bore 32.

When the full speed of flow has developed in the non-return valve 1, a negative pressure occurs at the edge of the valve disc 50, i.e. at the orifice of the angular bore 55 relative to the positive pressure at the end face of the valve disc 50. This negative pressure acts on the top of the piston 25 via the bore 55 and brings the movable valve body means into the top end position, i.e. the valve-open position (not shown).

In the event of a pipe fracture in the feed line upstream of the inlet connection 3, a negative pressure wave is propagated from the break through the non-return valve 1 and decelerates the mass of flowing water and ultimately accelerates the water in the opposite direction. Upon the change of direction of the water flow, the movable valve body means of the valve 1 starts to move in the closing direction. During the initially accelerated closing movement of the valve body means, the damping ring 27 moves into the duct portion 30 so that the flow of water from the cylinder chamber 15' is throttled. The pressure which then builds up in the cylinder chamber 15' brakes or slows the closing movement. This results in a less abrupt deceleration of the water mass flowing back through the non-return valve 1. Accordingly, there is a much smaller pressure rise at the outlet connection 4. Thus, the lines connected to the outlet connection 4 can withstand the rise in pressure.

As a note, without the damping effect, the movement of the movable valve body means would take place at an accelerated rate until the valve disc 50 would close on the valve seat 53 with a great force. During such a rapid closing, the water mass flowing rearwardly through the non-return valve at high speed would be abruptly decelerated. This would result in a considerable pressure rise, depending upon the amount of deceleration on the non-return valve exit side. Such a rise in pressure could result in a secondary pipe fracture.

Of further note, one disadvantage of damping the valve closing movement is that, in the event of a pipe fracture, a greater quantity of water escapes through the break. In order to minimize the water loss, the damping of the closing movement of the valve can be optimized. For example, this optimization can be simply obtained by altering the cross-section of the damping ring 27. To obtain a progressive braking, the damping ring 27 can be tapered conically in the lower zone, as viewed, towards the valve disc 50.

Various modifications in the valve construction, may also be made. For example, if the non-return valve is used for a gaseous medium or if, in the case of a liquid medium, the temperature of the medium is sufficiently below the evaporation temperature, the non-return ball member 42 can be eliminated.

Further, instead of using an inclined bore 32, the connecting duct 55 for the cylinder chamber 15 may utilize a diametric bore in the valve spindle 22 just beneath the shoulder 28 which merges into the angled bore 55. The cylinder chamber 15 may be connected to the housing chamber on the outlet side via a bore which leads through the wall of the insert 10 instead of through the angled bore 55. However, the disadvantage of this duct arrangement would be that the movable valve body means would be moved only in an intermediate position by the same pressure drop on the non-return valve. This means that the valve would then fully open only with a greater through flow than is the case in the example described above.

The cross-sections of the damping ring 27 and of the co-acting profile of the insert 10 can also be formed so that damping is effected solely or mainly through a substantially middle portion of the valve travel.

What is claimed is:

1. A non-return valve comprising
a housing defining a chamber and including an inlet connection to said chamber, an installation opening opposite said inlet connection and an outlet connection from said housing chamber;
an insert fixedly mounted within said installation opening to define a second chamber coaxial to said inlet connection;
a movable valve body means including a displaceable piston dividing said second chamber into two coaxial cylinder chambers, a valve spindle secured to said piston and passing through a bore of said insert and a valve disc secured to said spindle for selectively sealing said inlet connection in response to movement of said means from a valve-open position to a valve-closed position;

a first connecting duct communicating said cylinder chamber between said piston and said installation opening with said housing chamber;

a second connecting duct communicating said cylinder chamber between said piston and said inlet connection with said housing chamber; and a damping member secured to said movable valve body means for penetrating into said second duct to throttle flow therethrough upon movement of said means into said valve-closed position.

2. A non-return valve as set forth in claim 1 wherein said insert is flanged and a cover secures said insert within said installation opening.

3. A non-return valve as set forth in claim 1 wherein said housing has a valve seat at said inlet connection and said valve disc has a circular sealing surface for seating on said valve seat.

4. A non-return valve as set forth in claim 3 wherein said outlet connection is disposed between said valve seat and said installation opening.

5. A non-return valve as set forth in claim 3 wherein said first connecting duct extends longitudinally through said valve spindle and terminates adjacent said sealing surface of said valve disc.

6. A non-return valve as set forth in claim 1 which further comprises a bypass duct communicating said cylinder chamber between said piston and said inlet connection with said housing chamber and a non-return member in said bypass duct to allow flow into said latter cylinder chamber from said housing chamber.

7. A non-return valve as set forth in claim 1 wherein said damping member is an interchangeable annular ring secured between said piston and a shoulder on said valve spindle.

8. A non-return valve as set forth in claim 1 wherein said insert is fixedly mounted in said housing.

9. A non-return valve as set forth in claim 1 wherein said second connecting duct includes a bore extending through said insert.

10. A non-return valve as set forth in claim 1 wherein said second connecting duct includes an annular chamber between said insert and said valve spindle and said damping member is disposed to penetrate into said annular chamber.

11. A non-return valve comprising a housing defining a chamber and including an inlet connection to said chamber, and an outlet connection from said housing chamber;

an insert fixedly mounted within said housing to define a second chamber coaxial to said inlet connection;

a movable valve body means including a displaceable piston dividing said second chamber into two coaxial cylinder chambers, a valve spindle secured to said piston and passing through said insert in slidable relation and a valve disc secured to said spindle for selectively sealing said inlet connection in response to movement of said means from a valve-open position to a valve-closed position;

a first connecting duct communicating said cylinder chamber between said piston and said installation opening with said housing chamber;

a second connecting duct communicating said cylinder chamber between said piston and said inlet connection with said housing chamber; and a damping member secured to said movable valve body means for penetrating into said second duct to throttle flow therethorugh upon movement of said means into said valve closed position.

* * * * *

UNITED STATES PATENT AND TRADEMARK OFFICE
CERTIFICATE OF CORRECTION

PATENT NO. : 4,603,710

DATED : August 5, 1986

INVENTOR(S) : Edelbert Tiefenthaler

It is certified that error appears in the above-identified patent and that said Letters Patent is hereby corrected as shown below:

Column 6, line 27 change "between" to --above--

Column 6, lines 27 to 28 cancel "and said installation opening"

Column 6, line 34 change "therethorugh" to --therethrough--

Signed and Sealed this

Seventeenth Day of March, 1987

Attest:

DONALD J. QUIGG

Attesting Officer

Commissioner of Patents and Trademarks